United States Patent [19]
McDonald et al.

[11] Patent Number: 6,082,884
[45] Date of Patent: Jul. 4, 2000

[54] ADJUSTABLE FIBER OPTIC LIGHTING FIXTURE FOR INDIVIDUALLY ADJUSTING THE COLOR, FOCAL LENGTH AND AIM OF THE PRODUCED LIGHT AND METHOD

[75] Inventors: Jeff McDonald, University Heights; Wes Schroeder, Seville; Bruce Straslicka, Medina, all of Ohio

[73] Assignee: Unison Fiber Optic Systems, L.L.C., Solon, Ohio

[21] Appl. No.: 09/031,600

[22] Filed: Feb. 27, 1998

[51] Int. Cl.[7] .................................................... F21V 7/04
[52] U.S. Cl. .......................... 362/554; 362/551; 362/556; 362/581; 362/583; 362/576
[58] Field of Search ........................... 362/551, 554–560, 362/576–583, 217–225, 238–241, 249, 147, 277, 449, 801

[56] References Cited

U.S. PATENT DOCUMENTS

| 5,014,171 | 5/1991 | Price, III | 362/277 |
| 5,050,047 | 9/1991 | Viner et al. | 362/554 |
| 5,260,686 | 11/1993 | Kuo | 362/479 |
| 5,268,977 | 12/1993 | Miller | 385/33 |
| 5,303,125 | 4/1994 | Miller | 362/554 |
| 5,325,272 | 6/1994 | Miller | 362/554 |
| 5,486,984 | 1/1996 | Miller | 362/554 |

*Primary Examiner*—Sandra O'Shea
*Assistant Examiner*—Ismael Negron
*Attorney, Agent, or Firm*—Rogers & Killeen

[57] ABSTRACT

A fiber optic track lighting fixture and method with independent focusing and aiming of the individual light beams therefrom. The fixture comprises subassemblies easily assembled to form the fixture.

29 Claims, 3 Drawing Sheets though such known fixtures do not provide for selectively focusing the beam for each luminaire, do not provide for easy control of the number of luminaires, and do not provide for individual color control.

6,082,884

ADJUSTABLE FIBER OPTIC LIGHTING FIXTURE FOR INDIVIDUALLY ADJUSTING THE COLOR, FOCAL LENGTH AND AIM OF THE PRODUCED LIGHT AND METHOD

BACKGROUND OF THE INVENTION

The present invention relates to track lighting and more particularly to fiber optic light fixtures.

The use of track lighting is well known and finds utility in the display field where flexibility is a great advantage. Fiber optic systems have been adapted to track lighting and, in addition to flexibility in the positioning of a beam of light, have served the useful purpose of removing the heat source from the space in which the fixture is located to a remote location.

Known fiber optic light fixtures such as that described in the Miller U.S. Pat. No. 5,325,272 dated Jun. 28, 1994, provide a luminaire which may be positioned along a track and which includes a mirror with two degrees of rotation to selectively position the light beam emanating therefrom. However, such known fixtures do not provide for selectively focusing the beam for each luminaire, do not provide for easy control of the number of luminaires, and do not provide for individual color control.

Accordingly, it is an object of the present invention to provide a novel fiber optic lighting fixture which obviates the deficiencies of known fixtures and which provides extraordinary flexibility in providing display lighting.

It is another object of the present invention to provide a novel method of selectively providing display lighting.

It is yet another object of the present invention to provide a novel fiber optic lighting fixture which is low in cost and easy to manufacture and to assemble, and which is easily adaptable to light guides of different diameters.

It is still another object of the present invention to provide a novel fiber optic lighting fixture and method with individual control over the color and focusing of the light from the luminaires.

It is yet still another object of the present invention to provide a novel fiber optic lighting fixture and method in which the number of luminaires is easily varied.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
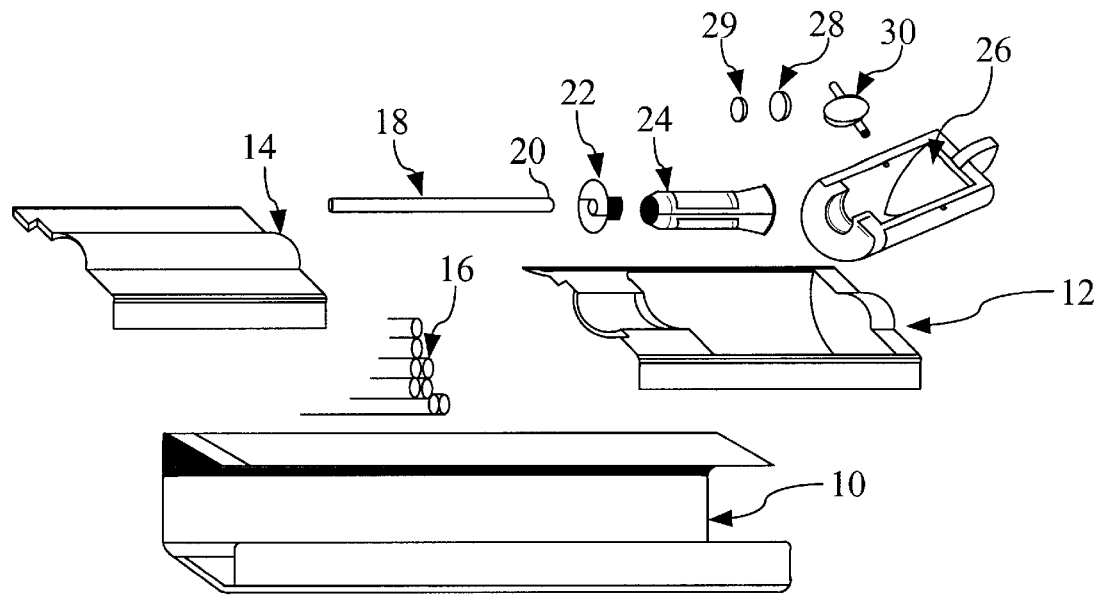
FIG. 1 is an exploded pictorial view of one embodiment of the present invention in partial section.
Figure 2:
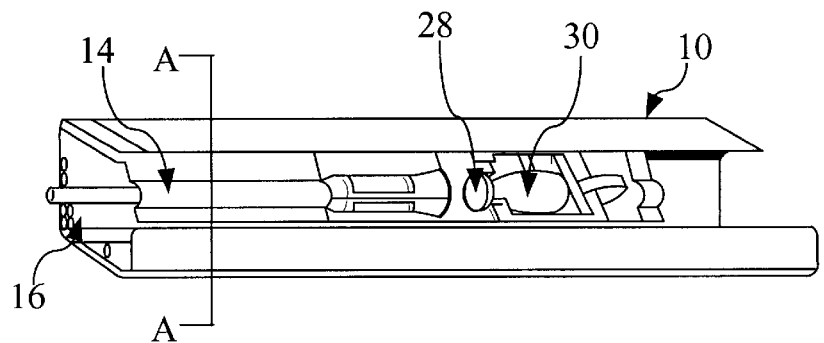
FIG. 2 is a pictorial view in partial section showing the assembly of the components of FIG. 1.
Figure 3:
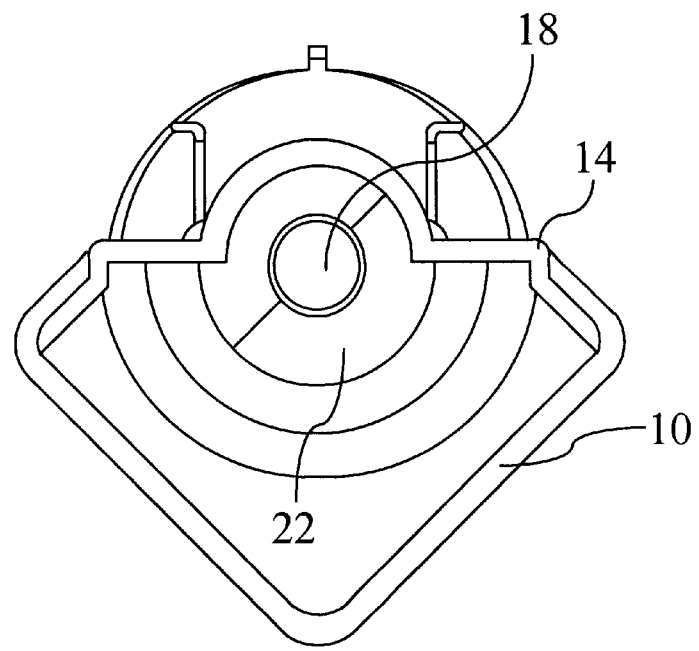
FIG. 3 is an elevation taken through lines A—A in FIG. 2.
Figure 5:
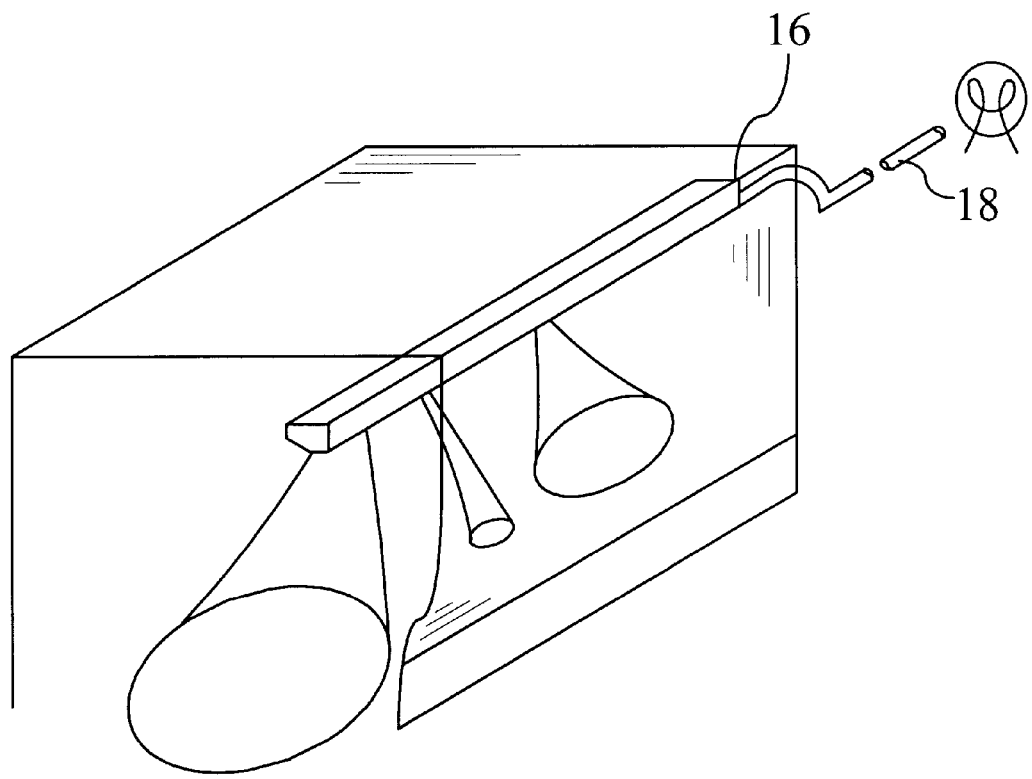
FIG. 5 is a pictorial view showing the installation of the embodiment in a display case.

With reference to FIG. 1, the elongated track 10 is preferably extruded aluminum but may be made of other metals or suitable plastics and may be mounted, e.g., internally along the upper corner of a display case as shown in FIG. 5.

A chassis 12 is adapted to slide into the track 10 from the end or to snap therein through the open side. One or more chassis may be used and may be selectively positioned along the length of the track at desired locations as a function of the merchandise to be displayed. An optional cover plate 14 may be snapped into the track from the open side thereof intermediate the chassis 12 and may serve to maintain the chassis 12 in the desired position along the track 10.

As shown in FIG. 5, a bundle 16 of suitable conventional fiber optic cables or light guides is provided with its distal end in light receiving relationship to a suitable source of illumination such as a conventional metal halide lamp (not shown). This bundle 16 of cables extends along the track into proximity to one of the chassis 12 where one of the cables 18 is separated from the bundle 16.

Figure 4:
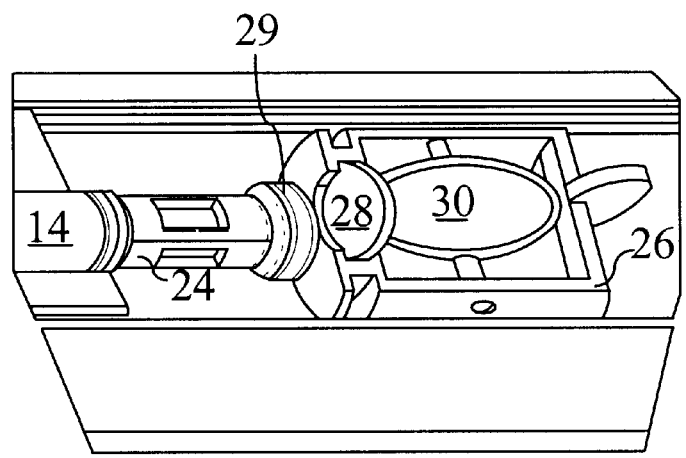
FIG. 4 is a pictorial enlargement of a portion of the fixture shown in FIG. 2.

As shown in FIGS. 1 and 4, the end 20 of a fiber optic cable or light guide 18 is inserted into a connector collet 22 which may be inserted into a connector housing 24 which may be snapped into one end of the chassis 12 so that it is maintained axially aligned with the longitudinal axis of the track 10 to provide a beam of light from the remote source along the longitudinal axis of each chassis 12.

The chassis 12 desirably forms a truncated cylindrical cavity into which a carriage 26 may be snapped. When in place in the chassis 12, the carriage 26 is retained on a common longitudinal axis with the connector housing 24 but is free to translate along that axis within the limitations of the cavity in the chassis 12. The carriage 26 is also free to rotate about the longitudinal axis.

At the end of the carriage 26 nearest the light guide 18, the carriage 26 is provided with a slot receptacle for a lens 28. The lens may be easily changed to maximize the flexibility of the fixture. At the end of the connector housing 24 nearest carriage 26, the connector housing 24 may be provided with a slot receptacle for a color filter 29. The color filter 29 may easily be changed independently of the lens 28 by snapping the filter into a slot in the connector housing 24. In this way, the focal length/spot size and color of the spot may be individually controlled.

The carriage 26 also contains a mirror 30 which is desirably provided with pivotal mounting pins or projections adapted for insertion into the walls of the carriage 26. In this way, the mirror may rotate about the axis of the pins.

The fixture of the present invention provides great flexibility in the focus and positioning of the light within the display case. The number of luminaires may easily be varied, and for each luminaire, the filter 29 may be selected to provide the desired color. The lens 28 of the individual luminaire may be readily changed to select the desired focal length/spot size. The translation of the carriage 26 along the chassis 12 of the individual luminaire permits the focus of the beam of light to be changed. The aiming of the light from each luminaire may be individually controlled by the rotation of the carriage 26 within the chassis 12 in a first degree of mirror rotation and the rotational mounting of the mirror 30 in the carriage 26 provides a second degree of rotation for the mirror 30.

The entire fixture is readily assembled with the lens and mirror carrying carriage 26 and connector housing 24 removably assembled into the chassis 12 to form a subassembly which is then easily positioned along the track.

The number of luminaires within the track may be easily varied, even for a fiber optic cable having a fixed number of light guides. The desired number of luminaries may be inserted into the track and the free end of any guide within the cable may be capped with any suitable conventional termination to prevent any unwanted light from exiting such guide.

The fixture of the present invention may also be used with fiber optic cables having light guides of different diameter, so that the fixture may be easily retrofitted into an existing system with a previously installed light source and fiber optic cable. All that is required is the selection of an appropriately sized connector collet 22 and connector housing 24, and all of the other elements of the fixture may remain unchanged.

While a preferred embodiment of the present invention has been described, it is to be understood that the embodiment described is illustrative only and the scope of the invention is to be defined solely by the appended claims when accorded a full range of equivalence, many variations and modifications naturally occurring to those of skill in the art from a perusal hereof.

What is claimed is:

1. A luminaire subassembly for a fiber optic track lighting system comprising a chassis adapted for removable connection to the track of a fiber optic lighting system and a subassembly adapted for removable connection to said chassis, said subassembly comprising:

a generally cylindrical carriage longitudinally open over less than 180° of the circumference thereof, said carriage having first and second transverse slots and a pair of diametrically opposite holes in the internal wall thereof;

a selectively removable lens adapted for removable insertion into one of the slots in said carriage for focusing a beam of light passing therethrough along the longitudinal axis of said carriage;

a selectively removable color filter adapted for removable insertion into the other one of the slots in said carriage for modifying the color of a beam of light passing therethrough along the longitudinal axis of said carriage; and a generally circular mirror having a pair of diametrically opposite projections extending outwardly therefrom, said projections being adapted to be received in the holes in the internal wall of said carriage whereby said mirror may be removably carried by said carriage along the longitudinal axis of said chassis for pivotable movement about the axis of said projections to thereby provide a first degree of rotation of said mirror with respect to chassis in the aiming of a beam of light passing along the longitudinal axis of said carriage and incident upon said mirror.

2. The subassembly of claim 1, wherein said carriage is removably mounted for rotation within said chassis independently of translation with respect to said luminaire subassembly to provide a second degree of rotation in aiming of a beam of light reflected from said mirror.

3. The subassembly of claim 1, wherein said mirror has a second degree of rotation about the longitudinal axis of the beam.

4. A method of lighting comprising the steps of:
(a) providing plural light guides for directing plural beams of light in a predetermined path;
(b) interposing a lens and mirror assembly in the path of each of the beams of light;
(c) for each of the beams of light, (i) selectively adjusting the distance of the lens from the light guide from which it emanates to thereby focus the beam of light, and (ii) selectively rotating the mirror about two orthogonal axes passing through the mirror to thereby aim the beam of light.

5. The method of claim 4, including the step of rotating said lens and said mirror independently of translation with respect to said light guide.

6. The method of claim 4, including the step of adjusting the focus of the beam by removing and replacing said lens.

7. The method of claim 4, including the step of appropriately sizing said housing means for the diameter of the light guide to which connected.

8. A fiber optic track lighting system including the means for:
(a) elongated tracks;
(b) a plurality of light guides each adapted to receive illumination from a remote source and to emit light within the fixture;
(c) a plurality of luminaires each including first and second independent subassemblies, each of said luminaires being selectively positioned along the length of said elongated track, each of said first subassemblies comprising selectively removable housing means to selectively connect one end of one of said pluralities of light guides in a predetermined fixed relationship to one of said luminaires to thereby provide a beam of light along a path generally longitudinal of the fixture, each of said second subassemblies comprising a selectively removable lens and a removable mirror along the path of the beam of light, said mirror having a first degree of rotation with respect to said subassembly about an axis passing through the mirror to thereby provide a first degree of rotation of the mirror in the aiming of a beam of light reflected from said mirror, said second subassembly being removably mounted for translation of said lens and said mirror within said luminaire to thereby selectively vary the focus of a light beam passing through said lens, and said second subassembly being removably mounted for rotation within said luminaire independently of translation with respect to said luminaire to thereby provide a second degree of rotation of said mirror in the aiming of a light beam reflected from said mirror.

9. The system of claim 8, wherein said lens may be removed and replaced to select a desired focal length/spot size.

10. The system of claim 8, wherein said lens and said mirror are translated as a unit to vary focus of the beam of light passing through said lens.

11. The system of claim 8, wherein said housing means has a slot for a color filter and wherein said housing means is appropriately sized for the diameter of the light guide to which connected.

12. A fiber optic track lighting system including the means for:
(a) elongated tracks;
(b) a plurality of light guides each adapted to receive illumination from a remote source and to emit light within said elongated tracks;
(c) a plurality of luminaires each including first and second independent subassemblies, each of said luminaires being selectively positioned along the length of said elongated tracks in a chassis adapted for removable connection to the elongated tracks, (d) each of said first subassemblies comprising selectively removable housing means to selectively connect one end of one of said pluralities of light guides in a predetermined fixed relationship to one of said luminaires to thereby provide a beam of light along a path generally longitudinal of the elongated tracks, (e) each of said second subassemblies adapted for removable connection to said chassis, said second subassembly comprising:

a generally cylindrical carriage longitudinally open over less than 180° of the circumference thereof, said carriage having first and second transverse slots and a pair of diametrically opposite holes in the internal wall thereof;

a selectively removable lens adapted for removable insertion into one of the slots in said carriage for focusing a beam of light passing therethrough along the longitudinal axis of said carriage;

a selectively removable color filter adapted for removable insertion into the other one of the slots in said carriage for modifying the color of a beam of light passing therethrough along the longitudinal axis of said carriage; and a generally circular mirror having a pair of diametrically opposite projections extending outwardly therefrom, said projections being adapted to be received in the holes in the internal wall of said carriage whereby said mirror may be removably carried by said carriage along the longitudinal axis of said chassis for pivotable movement about the axis of said projections to thereby provide a first degree of rotation of said mirror with respect to chassis in the aiming of a beam of light passing along the longitudinal axis of said carriage and incident upon said mirror; and said second subassembly being removably mounted for translation of said lens and said mirror within said luminaire to thereby selectively vary the focus of a light beam passing through said lens, and said second subassembly being removably mounted for rotation within said luminaire independently of translation with respect to said luminaire to thereby provide a second degree of rotation of said mirror in the aiming of a light beam reflected from said mirror.

13. The system of claim 12, wherein said lens may be removed and replaced to select a desired focal length/spot size and said color filter is changed by snapping the filter into one of said traverse slots.

14. The system of claim 12, wherein said lens and said mirror are translated as a unit to vary focus of the beam of light passing through said lens.

15. The system of claim 12, wherein said housing means is appropriately sized for the diameter of the light guide to which connected.

16. A method of lighting comprising (a) providing elongated tracks;

(b) providing a plurality of light guides each adapted to receive illumination from a remote source and to emit light within said elongated tracks;

(c) providing a plurality of luminaires each including first and second independent subassemblies, each of said luminaires being selectively positioned along the length of said elongated tracks in a chassis adapted for removable connection to the elongated tracks, (d) selectively connecting each of said first subassemblies comprising selectively removable housing means to one end of one of said pluralities of light guides in a predetermined fixed relationship to one of said luminaires to thereby provide a beam of light along a path generally longitudinal of said elongated tracks, (e) interposing each of said second subassemblies adapted for removable connection to said chassis, said second subassembly comprising:

a generally cylindrical carriage longitudinally open over less than 180° of the circumference thereof, said carriage having first and second transverse slots and a pair of diametrically opposite holes in the internal wall thereof;

a selectively removable lens adapted for removable insertion into one of the slots in said carriage for focusing a beam of light passing therethrough along the longitudinal axis of said carriage;

a selectively removable color filter adapted for removable insertion into the other one of the slots in said carriage for modifying the color of a beam of light passing therethrough along the longitudinal axis of said carriage; and a generally circular mirror having a pair of diametrically opposite projections extending outwardly therefrom, said projections being adapted to be received in the holes in the internal wall of said carriage whereby said mirror may be removably carried by said carriage along the longitudinal axis of said chassis for pivotable movement about the axis of said projections to thereby provide a first degree of rotation of said mirror with respect to said chassis in the aiming of a beam of light passing along the longitudinal axis of said carriage and incident upon said mirror;

(f) for each of the beams of light:

(i) selectively adjusting the distance of the lens from the light guide from which it emanates to thereby focus the beam of light, (ii) selectively adjusting the beam color by removing and replacing the color filter, and (iii) selectively rotating the mirror about two orthogonal axes passing through the mirror to thereby aim the beam of light.

17. The method of claim 16, including the step of rotating said lens and said mirror as a unit.

18. The method of claim 16, including the step of rotating said lens and said mirror independently of translation with respect to said housing means.

19. The method of claim 16, including the step of adjusting the focus of the beam by removing and replacing said lens.

20. The method of claim 16, including the step of adjusting the focus of the beam by translating said lens and said mirror as a unit.

21. The method of claim 16, including the step of changing said color filter by snapping the filter into one of said traverse slots.

22. The method of claim 16, including the step of appropriately sizing said housing means for the diameter of the light guide to which connected.

23. A luminaire subassembly for a fiber optic track lighting system comprising a carriage longitudinally open over less than 180° of the circumference thereof, a lens for focusing a beam of light passing therethrough along the longitudinal axis of said carriage;

a color filter for modifying the color of a beam of light passing therethrough along the longitudinal axis of said carriage; and a mirror carried by said carriage along the longitudinal axis of said luminaire subassembly chassis for pivotable movement about the axis passing through the mirror to thereby provide a first degree of rotation of said mirror with respect to said luminaire subassembly in the aiming of a beam of light passing along the longitudinal axis of said carriage and incident upon said mirror.

24. The subassembly of claim 23, wherein said carriage is removably mounted for rotation within said chassis independently of translation with respect to said luminaire subassembly to provide a second degree of rotation in aiming of a beam of light reflected from said mirror.

25. The luminaire subassembly of claim 23, wherein said mirror has a second degree of rotation about the longitudinal axis of the beam.

26. The luminaire subassembly of claim 23, wherein said lens may be removed and replaced to select a desired focal length/spot size.

27. The luminaire subassembly of claim 23, wherein said color filter may be removed and replace to select a desired color.

28. The luminaire subassembly of claim 27, wherein said mirror is circular.

29. The method of claim 4, including the step of rotating said lens and said mirror as a unit.

* * * * *